(12) United States Patent
Kawaguchi et al.

(10) Patent No.: US 10,516,243 B2
(45) Date of Patent: Dec. 24, 2019

(54) WIRE HARNESS CONNECTING STRUCTURE FOR TWO CIRCUIT ASSEMBLIES

(71) Applicant: Sumitomo Wiring Systems, Ltd., Yokkaichi, Mie (JP)

(72) Inventors: Kiyofumi Kawaguchi, Mie (JP); Maiko Oda, Mie (JP); Takumi Ejima, Mie (JP); Toshifumi Suzuki, Mie (JP); Yoshikazu Obara, Mie (JP); Yuki Wada, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 16/160,252

(22) Filed: Oct. 15, 2018

(65) Prior Publication Data
US 2019/0115702 A1    Apr. 18, 2019

(30) Foreign Application Priority Data
Oct. 16, 2017   (JP) ................................ 2017-200534

(51) Int. Cl.
| | |
|---|---|
| *H01R 25/00* | (2006.01) |
| *H01R 13/6461* | (2011.01) |
| *H01R 13/631* | (2006.01) |
| *H01R 13/502* | (2006.01) |
| *H01R 13/405* | (2006.01) |
| *H01M 2/20* | (2006.01) |
| *H01M 10/42* | (2006.01) |

(Continued)

(52) U.S. Cl.
CPC ............ *H01R 25/003* (2013.01); *H01M 2/20* (2013.01); *H01M 10/4257* (2013.01); *H01R 13/405* (2013.01); *H01R 13/502* (2013.01); *H01R 13/6215* (2013.01); *H01R 13/6315* (2013.01); *H01R 13/6461* (2013.01); *H01R 25/006* (2013.01); *B60R 16/0207* (2013.01); *B60R 16/0238* (2013.01); *H01R 13/5219* (2013.01); *H01R 2201/26* (2013.01)

(58) Field of Classification Search
CPC ...... H01R 11/09; H01R 11/05; H01R 13/514; H01R 13/518
See application file for complete search history.

(56) References Cited

U.S. PATENT DOCUMENTS

| | | | | |
|---|---|---|---|---|
| 10,090,613 B2 * | 10/2018 | Choi | .................... | H01R 13/501 |
| 2016/0347183 A1 | 12/2016 | Kusumi et al. | | |
| 2018/0375256 A1 * | 12/2018 | Peterson | .............. | H01R 13/631 |

* cited by examiner

*Primary Examiner* — Ross N Gushi
(74) *Attorney, Agent, or Firm* — Honigman LLP (57) ABSTRACT

A wire harness connecting structure for two circuit assemblies is provided. The structure allows a wire harness to be easily connected to two circuit assemblies with high space efficiency, and can reduce noise in the wire harness. A first connection terminal is provided in a first circuit assembly and a second connection terminal is provided in a second circuit assembly are located adjacent to each other. Two electrical wire-side connection terminals are respectively provided at an end of a first electrical wire and an end of a second electrical wire are housed and positioned in a shared connector housing, and thus a single harness end connector is formed. A wire harness is constituted by the first electrical wire and the second electrical wire. The electrical wire-side connection terminals of the wire harness are configured to be electrically connected to the first connection terminal and the second connection terminal.

11 Claims, 5 Drawing Sheets

(51) Int. Cl.
*H01R 13/621* (2006.01)
*B60R 16/02* (2006.01)
*H01R 13/52* (2006.01)
*B60R 16/023* (2006.01)

WIRE HARNESS CONNECTING STRUCTURE FOR TWO CIRCUIT ASSEMBLIES

CROSS-REFERENCE TO RELATED APPLICATIONS

This application claims priority of Japanese Patent Application No. JP2017-200534 filed Oct. 16, 2017.

TECHNICAL FIELD

The present disclosure relates to a wire harness connecting structure for two circuit assemblies, the structure being used to electrically connect wire harnesses to two circuit assemblies.

BACKGROUND

Conventionally, an electrical component system in an automobile employs a circuit assembly such as a junction box that supplies, blocks, or distributes power from a battery, for example, and a wire harness that electrically connects various kinds of devices including such a circuit assembly to each other, so that efficient electrical wiring is realized.

Particularly due to demand for electrification of vehicles in recent years, the types and the number of circuit assemblies and wire harnesses that are to be employed are on the rise. For example, as disclosed in JP2016-220475A, in electric vehicles, hybrid cars, plug-in hybrid cars, and the like in recent years, a battery pack that includes a battery module and a junction box is provided under the floor of the seat, for example, and the junction box of the battery pack and an external PCU (Power Control Unit) or a charger need to be connected to each other using high-voltage wire harnesses that have a larger diameter than usual. Also, as disclosed in JP2016-220475A, two or more junction boxes are employed in some cases.

However, as the types and the number of circuit assemblies and wire harnesses increase, the number of steps for connecting wire harnesses to circuit assemblies via connectors or the like increases, and there is a problem in which workability degrades when a vehicle is assembled. Furthermore, due to demand to, for example, downsize a vehicle, it is necessary to more densely arrange a plurality of circuit assemblies and wire harnesses to which the circuit assemblies are connected. Therefore, it is possible to conceive of the idea of arranging two circuit assemblies adjacent to each other to save space. However, it is necessary to secure space in which wire harnesses and connectors are to be arranged, and there are limitations in saving space.

SUMMARY

The present disclosure has been made in view of the above-described situation, and an aim thereof is to provide a novel wire harness connecting structure for two circuit assemblies that can be used to easily connect wire harnesses to two circuit assemblies with high space efficiency.

A first aspect of the present disclosure is a wire harness connecting structure for two circuit assemblies, wherein a first connection terminal that is provided in a first circuit assembly, which is one circuit assembly out of the two circuit assemblies, and a second connection terminal that is provided in a second circuit assembly, which is the other circuit assembly out of the two circuit assemblies, are located adjacent to each other, two electrical wire-side connection terminals that are respectively provided at an end of a first electrical wire that is to be connected to the first connection terminal and at an end of a second electrical wire that is to be connected to the second connection terminal are housed and held in a shared connector housing so that a single harness end connector is formed, and the wire harness includes the first electrical wire and the second electrical wire that extend from the harness end connector, and the electrical wire-side connection terminals of the wire harness are configured to be electrically connected to the first connection terminal of the first circuit assembly and the second connection terminal of the second circuit assembly.

According to this aspect, first, the structure has a unique configuration in which a first connection terminal that is provided in a first circuit assembly, which is one circuit assembly out of the two circuit assemblies, and a second connection terminal that is provided in a second circuit assembly, which is the other circuit assembly out of the two circuit assemblies, are located adjacent to each other. In addition, two electrical wire-side connection terminals that are respectively provided at an end of a first electrical wire that is to be connected to the first connection terminal and at an end of a second electrical wire that is to be connected to the second connection terminal are housed and held in a shared connector housing so that a single harness end connector is formed, and the wire harness is formed so as to include the first electrical wire and the second electrical wire that extend from the harness end connector. With such a unique configuration, it is possible to connect the single connector, which is provided at an end of the wire harness, to the positive-side connection terminal of the first circuit assembly and the negative-side connection terminal of the second circuit assembly, to which, in conventional art, connectors that are separately provided at separate ends of wire harnesses are connected.

With this configuration, it is possible to easily connect the wire harness to the two circuit assemblies through a small number of work steps, and it is also possible to reduce the number of parts. Also, although conventional art requires that space is secured in which the harness end connectors of two wire harnesses can be attached and positioned, the above-described configuration allows the terminal connectors to be integrated into a single harness end connector of a wire harness. Thus, it is possible to improve space efficiency.

A second aspect of the present disclosure is the wire harness connecting structure according to the first aspect, wherein the first connection terminal is a positive-side connection terminal, the second connection terminal is a negative-side connection terminal, the first electrical wire is a positive-side electrical wire, and the second electrical wire is a negative-side electrical wire.

According to this aspect, the first electrical wire and the second electrical wire that extend from the single harness end connector are the positive-side electrical wire of one circuit assembly and the negative-side electrical wire of the other circuit assembly. Therefore, currents flow in opposite directions through the electrical wires that are led out so as to be located close to each other. Therefore, magnetic fields that will be generated can be cancelled out, which reduces electromagnetic induction noise or prevents it from occurring. Also, one of the electrical wires has a shield effect on the other electrical wire, and therefore it is possible to reduce jump-in noise from a motor or various kinds of on-board components.

A third aspect of the present disclosure is the wire harness connecting structure according to the second aspect, wherein the positive-side electrical wire and the negative-side electrical wire that extend from the harness end connector are housed in a shared covering member, and thus the wire harness is formed.

According to this aspect, the first electrical wire and the second electrical wire that extend from the single harness end connector are a positive-side electrical wire and a negative-side electrical wire, and currents flow in opposite directions through the electrical wires that are led out so as to be located close to each other. Therefore, magnetic fields that will be generated can be cancelled out, which reduces electromagnetic induction noise or prevents it from occurring. Also, one of the electrical wires has a shield effect on the other electrical wire. Furthermore, the electrical wires are housed in the shared covering member so as to be located close to each other. Therefore, such a configuration further prevents noise or the like from occurring, and improves the handleability of the wire harness as well. In particular, even if the wire harness is a high-voltage wire harness, it is possible to, for example, simplify the shielding structure, which also contributes to a reduction in costs, in addition to realizing high space efficiency.

The fourth aspect of the present disclosure is the wire harness connecting structure according to any one of the first to third aspects, wherein the first connection terminal provided in the first circuit assembly is housed and positioned in a connector housing that is provided in the first circuit assembly, and thus a first connector is formed, the second connection terminal provided in the second circuit assembly is housed and positioned in a connector housing that is provided in the second circuit assembly, and thus a second connector is formed, the harness end connector of the wire harness is configured to be fitted and connected to the first connector and the second connector at the same time, and at least one of the harness end connector; and each of the first and second connectors has a floating structure in which the connection terminal thereof and a housing movable portion that encloses the connection terminal are held so as to be displaceable relative to a body of the connector housing thereof.

According to this aspect, the harness end connector is configured to be fitted and connected to the first connector and the second connector, which are respectively provided in individual circuit assemblies, at the same time. Therefore, there is the risk of the positioning of the connectors being difficult due to dimensional tolerances accumulating. In view of this problem, at least one of the harness end connector; and each of the first and second circuit assembly connectors, is configured to have a floating structure, so that dimensional tolerances can be absorbed and the problem of concern can be advantageously solved.

The fifth aspect of the present disclosure is the wire harness connecting structure according to the fourth aspect, wherein the first circuit assembly and the second circuit assembly are housed and positioned in one circuit assembly housing, and the first connector and the second connector are located so as to face through holes that are provided in a wall of the circuit assembly housing, and the harness end connector is configured to be inserted into the through holes of the circuit assembly housing and to be connected to the first connector and the second connector.

According to this aspect, even if the first circuit assembly and the second circuit assembly are housed and positioned in a single housing, the harness end connector can be connected to the first connector and the second connector through the through holes provided in the wall of the housing. Therefore, no additional connector or wire is required, and it is possible to connect the wire harness to the two circuit assemblies that are housed and positioned in the housing, while keeping the small number of work steps. Also, the problem of concern in such a case, such as displacement due to tolerances accumulating, can be prevented from occurring, by employing a floating structure in at least one of the harness end connector; and each of the first and second connectors.

The sixth aspect of the present disclosure is the wire harness connecting structure according to the fifth aspect, wherein a positioning mechanism is provided between surfaces that face each other of the circuit assembly housing and the first connector and the second connector, the positioning mechanism including positioning protrusions and positioning cavities that are configured to be fitted to each other, the positioning protrusions being provided on one of the circuit assembly housing; and the first connector and the second connector, and the positioning cavities being provided in the other of the housing; and the first connector and the second connector, and a dimensional tolerance of a gap between surfaces that face each other of the positioning protrusions and the positioning cavities is smaller than the length of displacement of the connection terminal in the floating structure, relative to the connector housing.

According to this aspect, the connector that has a floating structure and the positioning mechanism including the positioning protrusions and cavities between the surfaces of the circuit assembly housing and the circuit assemblies are employed in combination. Therefore, it is possible to reduce the dimensional tolerance of the gap of the positioning mechanism so as to be smaller than the length of displacement of the floating structure. As a result, it is possible to further reduce variation in the positions of the first and second circuit assemblies in the circuit assembly housing, and it is possible to advantageously reduce or eliminate the possibility of displacement occurring between the through holes of the circuit assembly housing and the connectors of the first and second circuit assemblies.

A seventh aspect of the present disclosure is the wire harness connecting structure according to any one of the first to sixth aspects, wherein the outer circumferential surface of the connector housing of the harness end connector is press-fitted to inner circumferential edge portions of the through holes of the circuit assembly housing with seal members therebetween.

According to the present aspect, the outer circumferential surface of the connector housing of the harness end connector is press-fitted to the inner circumferential edge portions of the through holes of the circuit assembly housing with a seal member therebetween. Therefore, it is possible to ensure that the through hole is waterproof as well as to absorb vibrations or the like occurring between the through holes and the connector housing.

According to the present disclosure, a first connection terminal that is provided in a first circuit assembly, which is one circuit assembly out of the two circuit assemblies, and a second connection terminal that is provided in a second circuit assembly, which is the other circuit assembly out of the two circuit assemblies, are located adjacent to each other. In addition, two electrical wire-side connection terminals that are respectively provided at an end of a first electrical wire that is to be connected to the first connection terminal and at an end of a second electrical wire that is to be connected to the second connection terminal are housed and held in a shared connector housing so that a single harness end connector is formed, and the wire harness is formed so as to include the first electrical wire and the second electrical wire that extend from the harness end connector. With such a configuration, it is possible to connect the single connector, which is provided at an end of the wire harness, to the first connection terminal of the first circuit assembly and the second connection terminal of the second circuit assembly, to which, in conventional art, connectors that are separately provided at separate ends of wire harnesses are connected. Therefore, it is possible to easily connect the wire harness to the two circuit assemblies through a small number of work steps, and it is also possible to reduce the number of parts and improve space efficiency.

DETAILED DESCRIPTION OF PREFERRED EMBODIMENTS

The following describes an embodiment of the present disclosure with reference to the drawings.

First, FIGS. 1 to 6 show an example in which a wire harnesses connecting structure 10 for two circuit assemblies according to a first embodiment of the present disclosure is applied to a battery pack 36. That is, these drawings show a structure for electrically connecting wire harnesses 16a, 16b, and 16c to a first circuit assembly 14a and a second circuit assembly 14b, which constitute two circuit assemblies housed in a housing body 12 that constitutes a housing of the battery pack 36. In the following descriptions, "above" and "upward" refer to an upward direction in FIGS. 1 and 4 to 6, "below" and "downward" refer to a downward direction in FIGS. 1 and 4 to 6, "forward" refers to a direction to the left in FIGS. 2 and 3, and "rearward" refers to a direction to the right in FIGS. 2 and 3.

As shown in FIGS. 1 to 3 and 5, the wire harness 16a has a configuration in which a positive-side electrical wire 15a that is connected to a positive-side connection terminal 52 of a low-voltage circuit, which will be described later, is housed in a covering member 17 that is constituted by a shield member or an insulation member, and the wire harness 16b has a configuration in which a positive-side electrical wire 15a (a first electrical wire) that is connected to the positive-side connection terminal 52 (a first connection terminal) of the battery module 33, which will be described later, and a negative-side electrical wire 15b (a second electrical wire) that is connected to a negative-side connection terminal 52 (a second connection terminal) of the battery module 33 are housed in a covering member 17. Also, the wire harness 16c has a configuration in which a negative-side electrical wire 15b that is connected to a negative-side connection terminal 52 of a low-voltage circuit, which will be described later, is housed in a covering member 17.

Figure 1:
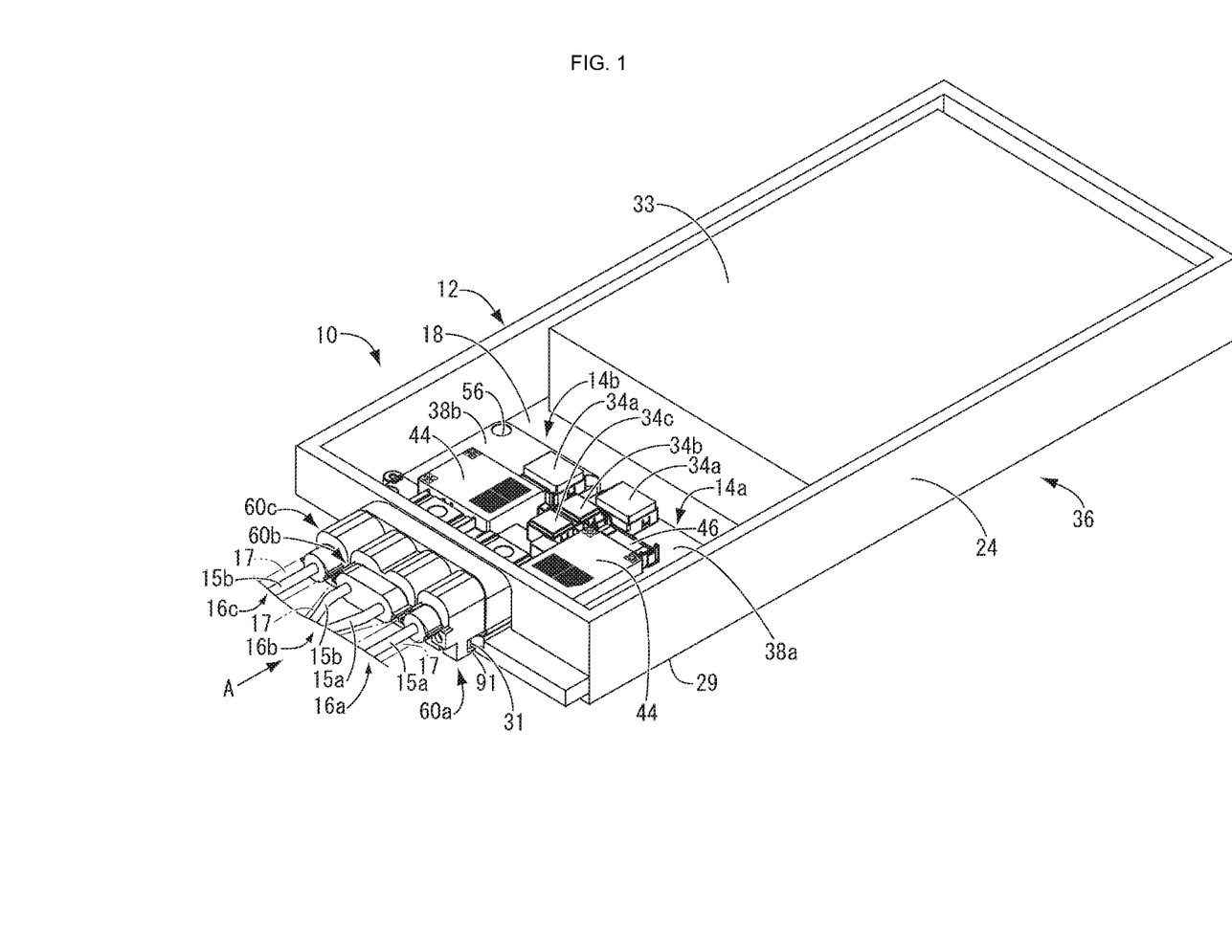
FIG. 1 is a perspective view of a wire harness connecting structure for two circuit assemblies, which is an embodiment of the present disclosure.
Figure 3:
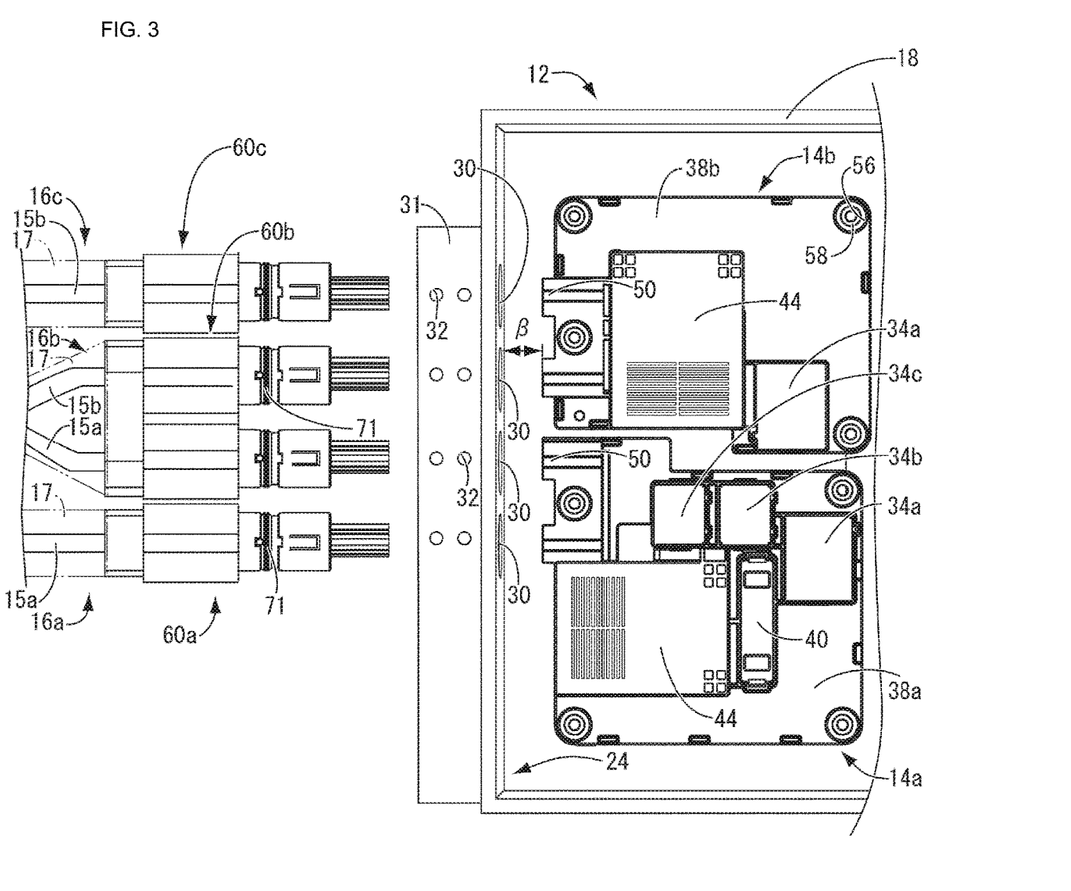
FIG. 3 is a plan view showing a state in which harness end connectors provided at ends of the wire harnesses in FIG. 2 are detached.
Figure 4:
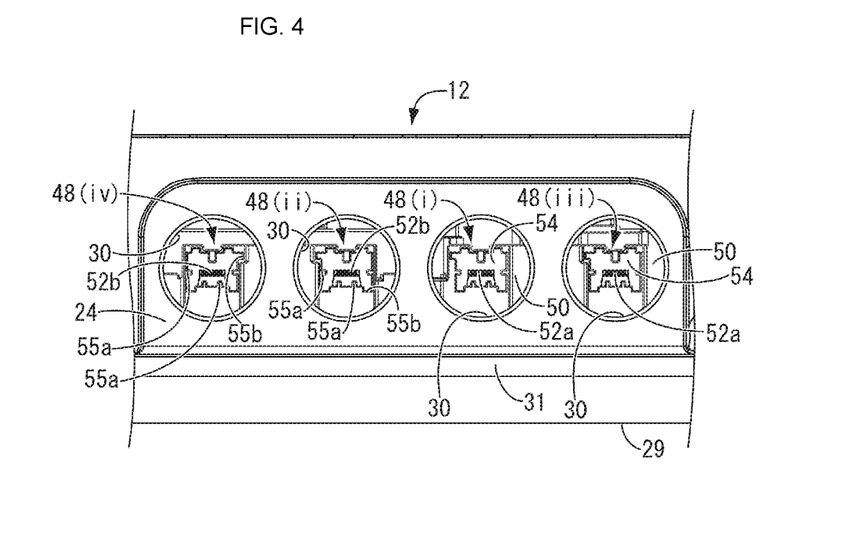
FIG. 4 is a front view of a portion of the housing shown in FIG. 1, in which the circuit assemblies are housed, and is a view in the direction indicated by an arrow A in FIG. 1.

As shown in FIG. 1, the housing body 12 is formed through die-casting using an aluminum alloy, for example, and substantially has a shallow box shape overall, which is substantially rectangular in plan view. The housing body 12 is fixed to and supported at a plurality of points on a vehicle body reinforcement member (not shown) located under a seat of a vehicle body, for example, using a fixing structure (not shown). Also, the housing body 12 is configured such that a housing lid (not shown), for example, can be fastened thereto using a locking structure (not shown), using bolts and nuts. In addition, as shown in FIGS. 3 and 4, a front-side portion of a peripheral wall 24 of the housing body 12 is provided with four through holes 30 that each have a substantially circular cross section, that each penetrate through the front-side portion of the peripheral wall 24 in a front-rear direction, that have the same shape, and that are separated from each other at equal intervals in the lengthwise direction of the front-side portion of the peripheral wall 24. The front-side portion of the peripheral wall 24 of the housing body 12, in which the through holes 30 are provided, is also provided with a harness end connector fixing portion 31 that is located below the through holes 30 and is higher than a bottom surface 29 of the housing body 12, has a substantially rectangular flat plate shape, and protrudes forward (see FIGS. 2 to 4). Fixing holes 32 that each have a substantially circular cross section penetrate through the harness end connector fixing portion 31 (see FIG. 3) so as to be able to hold connector housings 62a to 62c of harness end connectors 60a to 60c, which will be described later, using bolts, for example.

As shown in FIG. 1, the housing body 12 with such a configuration houses: a first circuit assembly 14a and a second circuit assembly 14b, which constitute the two circuit assemblies; and the battery module 33, which is constituted by an assembled battery in which lithium ion batteries, for example, are layered. Here, the first circuit assembly 14a and the second circuit assembly 14b are each configured as a junction box that electrically connects/disconnects the battery module 33 and the wire harness 16b to/from each other, using a relay circuit, and are connected to the battery module 33 via wires (not shown). In this way, in the present embodiment, the first circuit assembly 14a, the second circuit assembly 14b, and the battery module 33 are housed in the housing body 12 that constitutes a housing, and thus the battery pack 36 is formed.

Figure 5:
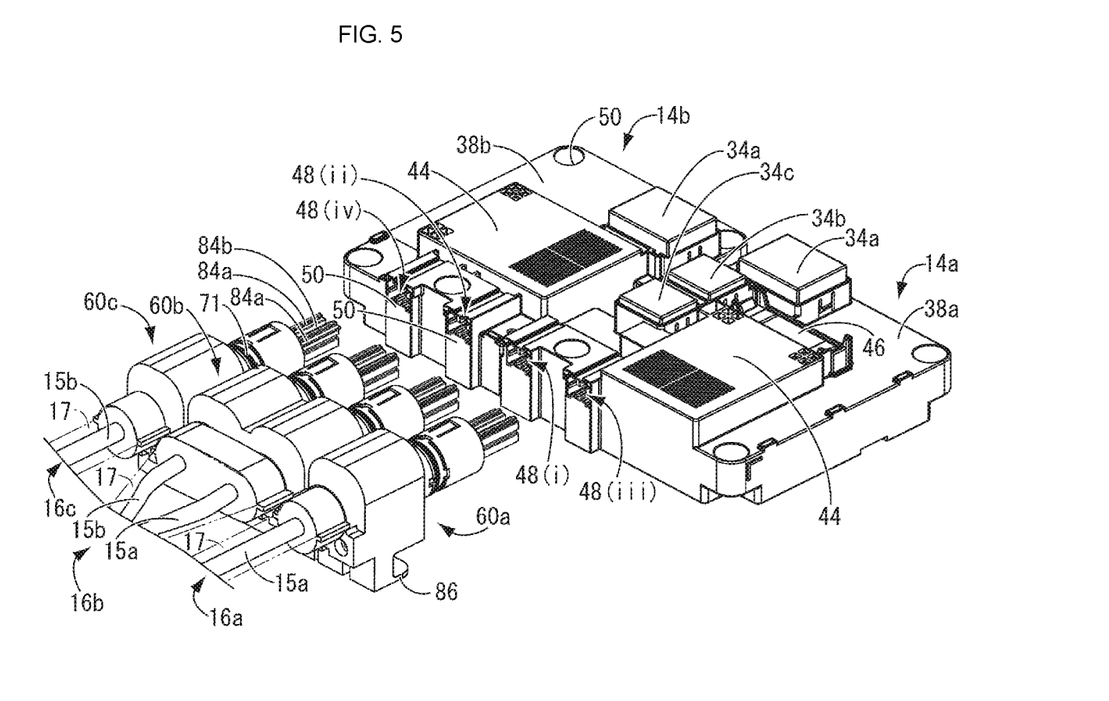
FIG. 5 is a perspective view of the harness end connectors provided at the ends of the wire harnesses, and the circuit assemblies.

FIG. 5 shows the first circuit assembly 14a, the second circuit assembly 14b, the wire harnesses 16a to 16c, and the harness end connectors 60a to 60c provided at the respective ends of the wire harnesses 16a to 16c. The first circuit assembly 14a and the second circuit assembly 14b respectively have resin cases 38a and 38b that each have a substantially rectangular box shape overall in plan view, and internal circuits (not shown) that include a bus bar, for example, are housed and arranged in each of the resin cases 38a and 38b. The first circuit assembly 14a and the second circuit assembly 14b are each provided with: a relay 34a that is connected to the positive side and the negative side of the battery module 33 and switches to an electrically connected state and an electrically disconnected state; and a battery controller 44 that makes an instruction to switch to the electrically connected state and the electrically disconnected state. In addition, the first circuit assembly 14a is provided with: a relay 34b and a resistor circuit 46 that constitute a positive-side bypass circuit for the battery module 33 to measure a current flowing on the positive side; and a relay 34c that connects/disconnects the positive side of a low-voltage circuit (not shown).

Figure 6:
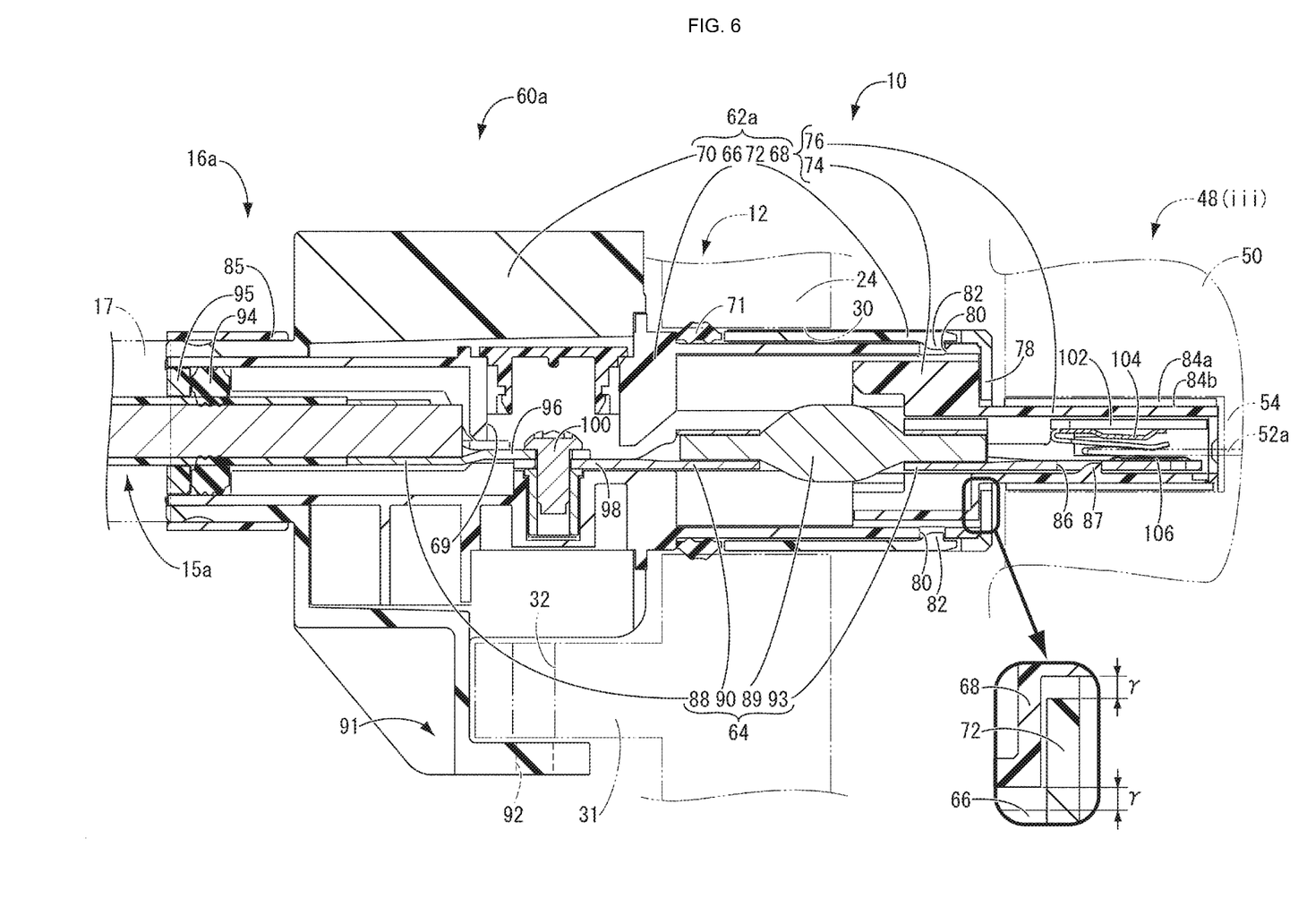
FIG. 6 is an enlarged cross-sectional view along a line VI-VI in FIG. 2.

Also, as shown in FIG. 5, first/third connectors 48(*i*) and 48(*iii*) are provided on upper portions of the front side wall of the first circuit assembly 14a so as to be separated from each other in the lengthwise direction of the front side wall. Similarly, second/fourth connectors 48(*ii*) and 48(*iv*) are provided on upper portions of the front side wall of the second circuit assembly 14b so as to be separated from each other in the lengthwise direction of the front side wall. Each of the connectors 48(*i*) to 48(*iv*) is provided with a connector housing 50 and a connection terminal 52 that is held by the connector housing 50 (see FIGS. 4 and 6). Each connector housing 50 has a substantially rectangular cross section and extends rearward (obliquely upward to the right in FIG. 5). Also, each connector housing 50 has a substantially rectangular tube shape with a bottom, and is open forward (obliquely downward to the left in FIG. 5). In contrast, each connection terminal 52 substantially has a flat plate shape, and protrudes forward from a substantially central portion of a bottom wall 54 of the connector housing 50 so as to have a length that does not reach the opening. In FIG. 6, in order to facilitate understanding, the connector 48 and the housing body 12 are drawn with imaginary lines. Ribs 55a and recessed grooves 55b that extend in the axial direction are provided in predetermined areas of the four side walls of each connector housing 50 (see FIG. 4). In particular, recessed grooves 55b in the left and right side walls are asymmetrically positioned, so that the harness end connectors 60a to 60c (described later) are prevented from being incorrectly attached.

In the present embodiment, the connector housing 50 of the first connector 48(*i*) of the first circuit assembly 14a, which is the connector provided closer to the second circuit assembly 14b, houses and positions a positive-side connection terminal 52a that is connected to the positive side of the battery module 33, whereas the connector housing 50 of the third connector 48(*iii*) of the first circuit assembly 14a, which is the connector provided farther from the second circuit assembly 14b, houses and positions a positive-side connection terminal 52a that is connected to a low-voltage circuit. Also, the connector housing 50 of the second connector 48(*ii*) of the second circuit assembly 14b, which is the connector provided closer to the first circuit assembly 14a, houses and positions a negative-side connection terminal 52b that is connected to the negative side of the battery module 33, whereas the connector housing 50 of the fourth connector 48(*iv*) of the second circuit assembly 14b, which is the connector provided farther from the first circuit assembly 14a, houses and positions a negative-side connection terminal 52b that is connected to the negative side of the low-voltage circuit. That is, the positive-side connection terminal 52a provided in the first circuit assembly 14a and the negative-side connection terminal 52b provided in the second circuit assembly 14b are located adjacent to each other, and are respectively housed and positioned in the connector housing 50 of the first connector 48(*i*) provided in the first circuit assembly 14a and the connector housing 50 of the second connector 48(*ii*) provided in the second circuit assembly 14b.

Figure 2:
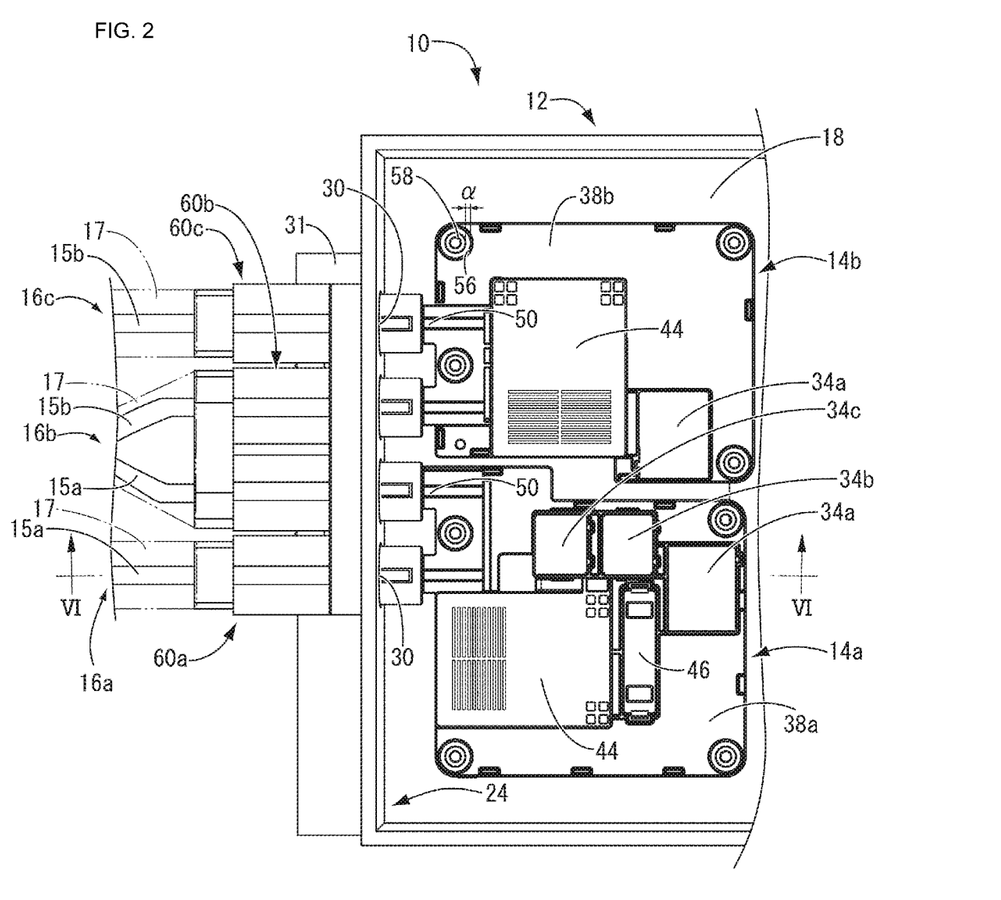
FIG. 2 is an enlarged plan view of portions of the circuit assemblies and a portion of a housing shown in FIG. 1.

Also, as shown in FIG. 2, the four corners of each of the resin cases 38a and 38b of the first circuit assembly 14a and the second circuit assembly 14b are respectively provided with positioning cavities 56 for positioning the first circuit assembly 14a or second circuit assembly 14b relative to the housing body 12. Each of the positioning cavities 56 has a substantially circular hole shape and penetrates through the resin case 38a or 38b in a top-bottom direction. When the first circuit assembly 14a and the second circuit assembly 14b are to be placed in the housing body 12, positioning protrusions 58 that protrude from appropriate positions of a bottom wall 18 of the housing body 12, and that each have a substantially cylindrical shape, are inserted into the positioning cavities 56 respectively provided at positions corresponding thereto, and thus the first circuit assembly 14a and the second circuit assembly 14b are positioned relative to the housing body 12. In this way, according to the present embodiment, the positioning protrusions 58 provided on the bottom wall 18 of the housing body 12 and the positioning cavities 56 provided in the first circuit assembly 14a and the second circuit assembly 14b are fitted to each other, and thus mechanisms for positioning the housing body 12 and the first circuit assembly 14a and the second circuit assembly 14b are formed. Here, a dimensional tolerance a (see FIG. 2) regarding the length of a gap between the respective surfaces of a positioning cavity 56 and a positioning protrusion 58 that face each other have been determined considering a manufacturing tolerance or the like.

When the first circuit assembly 14a and the second circuit assembly 14b are positioned and fixed to the housing body 12 in this way, the connectors 48 of the first circuit assembly 14a and the second circuit assembly 14b are, as shown in FIG. 3, housed and positioned in the housing so as to face the through holes 30 in the housing body 12 with a gap 13 therebetween (see FIG. 3). Also, as shown in FIG. 2, the harness end connectors 60a, 60b, and 60c provided at the ends of the wire harnesses 16 are inserted into the through holes 30 provided in the housing body 12, and are respectively connected to the connectors 48 (*iii*), 48(*i*) and 48(*ii*), and 48(*iv*) provided in the first circuit assembly 14a and the second circuit assembly 14b. The harness end connectors 60a to 60c are respectively provided with the connector housings 62a to 62c and electrical wire-side connection terminals 64 that are held by the connector housings 62a to 62c. Here, the harness end connector 60a and the harness end connector 60c have basically the same configuration, and the harness end connector 60b has basically the same configuration except that the connector housings that respectively house and position the two electrical wire-side connection terminals 64 respectively connected to the positive-side electrical wire 15a and the negative-side electrical wire 15b are arranged side by side and their side walls that are adjacent to each other (the respective sides walls, which are adjacent to each other, of body holding portions 70 (described below)) are integrated with each other using a coupling portion 65. Therefore, the following describes the harness end connector 60a as an example.

As shown in FIG. 6, the connector housing 62a of the harness end connector 60a includes: a housing body 66 that has a substantially cylindrical shape that is open in the axial direction (in the left-right direction in FIG. 6); a housing movable portion 68 that is attached to a leading end-side portion (on the right side in FIG. 6) of the housing body 66; a body holding portion 70 that holds a based end-side portion (on the left side in FIG. 6) of the housing body 66 inserted thereinto; and a cap member 72, which will be described later. A central portion of the housing body 66 in the axial direction is provided with a work hole 69 for coupling and fixing connection portions 96 and 98 of a first press-fit terminal 88 and a second press-fit terminal 90 (described later) using a bolt 100. The first press-fit terminal 88 and the second press-fit terminal 90 constitute an electrical wire-side connection terminal 64. The work hole 69 is to be covered by a lid member that substantially has a n shape cross section, after work has been completed. Also, a seal member 71 that is made of rubber and has a substantially trapezoidal cross section is provided on the outer circumferential surface of the housing body 66 at a position that is slightly closer to the leading end than the work hole 69 is, so as to extend along the entire circumferential surface. Here, the seal member 71 is fixed at a predetermined position, using a cap member 72 that has a substantially cylindrical shape and is fitted onto a leading end-side portion of the outer circumferential surface of the housing body 66. Thus, the outer circumferential surface of the housing body 66 is press-fitted to an inner circumferential edge portion of the through hole 30 in the housing body 12 with the seal member 71 therebetween. Therefore, it is possible to prevent water or the like from entering the housing body 12 through the wire harnesses 16*a* to 16*c*. Also, it is possible to advantageously absorb vibrations or the like occurring between the through hole 30 and the housing body 66.

The housing movable portion 68 includes a base end portion 74 (on the left side in FIG. 6) that has a large diameter, and a leading end portion 76 that has a smaller diameter than the base end portion 74. The housing movable portion 68 has a stepped cylindrical shape that is open in the axial direction. The base end portion 74 of the housing movable portion 68 is inserted into the leading end-side opening of the housing body 66 with a predetermined gap 65 therebetween in a radial direction (see FIG. 6). That is, the outer diameter of the base end portion 74 of the housing movable portion 68 is smaller than the inner diameter of the leading end-side opening of the housing body 66 due to the gap 65. Thus, the housing movable portion 68 can be displaced in a radial direction relative to the housing body 66. Note that the housing movable portion 68 is prevented from being detached from the leading end-side of the housing body 66 due to the housing movable portion 68 abutting against an inner flange portion 78 that extends inward in a radial direction from the leading end portion (on the right side in FIG. 6) of the cap member 72. Note that the cap member 72 may be fixed to the housing body 66 by, for example, locking a lock claw 82, which may be provided on the cap member 72, to a lock hole 80, which may be provided in the leading end portion of the housing body 66. The inner diameter of the inner flange portion 78 is larger than the outer diameter of the leading end portion of the housing movable portion 68 due to the gap y, and thus the housing movable portion 68 is not prevented from being displaced in a radial direction relative to the housing body 66.

The leading end portion 76 of the housing movable portion 68 has a substantially rectangular tube shape, and ribs 84*a* and recessed grooves 84*b* are formed on/in the four outer surfaces of the leading end portion 76 so as to correspond in shape to the four side walls of a connector housing 50 of the first circuit assembly 14*a* and the second circuit assembly 14*b*. That is, the cross-sectional shape of the outer circumferential surface of the leading end portion 76 of the housing movable portion 68 is similar to, but is smaller than the cross sectional shape of the inner circumferential surface of the connector housing 50 in terms of their diameters, due to the gap y that constitutes the difference between the radius of the housing body 66 and the radius of the housing movable portion 68. A rib 55*a* and a recessed groove 84*b*, and a rib 84*a* and a recessed groove 55*b*, are fitted to each other with a gap therebetween, and thus the housing movable portion 68 is positioned in the circumferential direction so as to be displaceable relative to the connector housing 50, and directions in which the housing movable portion 68 can be displaced are limited to the top-bottom direction and the left-right direction, which are two directions orthogonal to the axial direction that is the directions in which the connection terminal 52 extends. Also, the lower side wall of the leading end portion 76 of the housing movable portion 68 is provided with a lock claw 87 that is fitted into a lock hole 86 that is provided in a third press-fit terminal 93, which will be described later.

The body holding portion 70 of the connector housing 50 substantially has a hollow cylinder shape, and a base end-side portion thereof (on the left side in FIG. 6) has a slightly smaller diameter. The body holding portion 70 is attached to the outer surface of a base end-side portion (on the left side in FIG. 6) of the housing body 66. A leading end-side portion of the body holding portion 70 is provided with a fixing protrusion 91 that has a substantially L-shaped cross section and extends rearward (to the right in FIG. 6). A fixing hole 92 penetrates through the fixing protrusion 91. When the harness end connector 60*a* is inserted into a through hole 30 in the housing body 12 and is attached to a connector 48 of the first circuit assembly 14*a*, the harness end connector fixing portion 31 of the housing body 12 and the fixing protrusion 91 provided below the harness end connector fixing portion 31 can be fastened to each other, using a bolt and a nut, for example, through the fixing holes 32 and 92. Note that a clip ring 85 is press-fitted onto the base end-side portion, which has a slightly smaller diameter, of the body holding portion 70.

As shown in FIG. 6, the electrical wire-side connection terminal 64 of the harness end connector 60*a* includes: the first press-fit terminal 88 to which the positive-side electrical wire 15*a* of the wire harness 16*a* is press-fitted; the second press-fit terminal 90 to which one end of a flexible conductor 89 is press fitted; and the third press-fit terminal 93 to which the other end of the flexible conductor 89 is press fitted, which are arranged in this order from the based end side (the left side in FIG. 6) to the leading end side (the right side in FIG. 6) in the axial direction (the left-right direction in FIG. 6). Note that the flexible conductor 89 is constituted by a well-known member such as a braided wire. The first press-fit terminal 88 is housed in a base end-side portion of the housing body 66, and the outer circumferential surface of the positive-side electrical wire 15*a* that is press-fitted and connected to the first press-fit terminal 88 is provided with a seal member 94 that is made of rubber, that has a substantially rectangular cross section, and that extends along the entire circumference. A seal member 94 is fixed to a predetermined area of the outer circumferential surface of each of the wire harnesses 16*a* to 16*c*, using a cap member 95 that is substantially ring-shaped and is attached to the base end-side (the left side in FIG. 6) of the seal member 94. Thus, the outer circumferential surface of the positive-side electrical wire 15*a* is press-fitted to the inner circumferential surface of the housing body 66 with the seal member 94 therebetween. The second press-fit terminal 90 is housed in a central portion of the housing body 66, and the connection portion 96 of the first press-fit terminal 88 and the connection portion 98 of the second press-fit terminal 90 are coupled and connected to each other in the work hole 69, using the bolt 100. Thus, the first press-fit terminal 88 and the second press-fit terminal 90 are electrically connected to each other, and the second press-fit terminal 90 and the third press-fit terminal 93 are electrically connected to each other via the flexible conductor 89. The flexible conductor 89 is housed in a lead-end side portion of the housing body 66, and the third press-fit terminal 93 is provided so as to protrude from the leading end of the housing body 66. The base end portion 74 of the housing movable portion 68 encloses the respective press-fitted portions of the flexible conductor 89 and the third press-fit terminal 93, and a connection portion 102 of the third press-fit terminal 93 is housed in the leading end portion 76 of the housing movable portion 68 and is locked thereto. Note that the connection portion 102 of the third press-fit terminal 93 includes an elastic contact piece 104 and an embossed portion 106, between which the connection terminal 52 of the connector 48 of the first circuit assembly 14a is sandwiched so that electrical conduction is established.

As described above, in each of the harness end connectors 60a to 60c with such a configuration, the electrical wire-side connection terminal 64 and the housing movable portion 68 enclosing it are displaceable in a radial direction relative to the housing body 66 that constitutes the connector housing 62a, 62b, or 62c, and thus the electrical wire-side connection terminal 64 and the housing movable portion 68 have a floating structure that is held so as to be displaceable relative to the housing body 66. Also, the diameter of the outer circumferential surface of the leading end portion 76 of the housing movable portion 68 of each of the harness end connectors 60a to 60c is smaller than the diameter of the inner circumferential surface of the connector housing 50 of each of the connectors 48(i) to 48(iv) provided in the first circuit assembly 14a and the second circuit assembly 14b by a length corresponding to the gap y. Thus, even if the positions of the first circuit assembly 14a and the second circuit assembly 14b in the housing body 12 vary within a tolerance, the floating structures can absorb such displacement. Therefore, even if dimensional tolerances accumulate as in the structure according to the present embodiment in which the harness end connectors 60a to 60c are connected to the connectors 48(i) to 48(iv) of the first circuit assembly 14a and the second circuit assembly 14b provided in the housing body 12, it is possible to advantageously reduce or eliminate the risk of the positioning of the connectors being difficult. In addition, it is also possible to reduce the dimensional tolerance α (see FIG. 2) regarding the length of the gap between the respective surfaces of the positioning protrusion 58 and the positioning cavity 56 that face each other, within the range of the length of the gap γ, in which the electrical wire-side connection terminal 64 employing the above-described floating structure is displaceable relative to the housing body 66, thus it is possible to reduce the degree of variation within the dimensional tolerance.

In addition, as shown in FIG. 3, in the harness end connector 60b, the two electrical wire-side connection terminals 64, which are respectively connected to the end of the positive-side electrical wire 15a of the wire harness 16b connected to the positive-side connection terminal 52a of the first circuit assembly 14a, and the end of the negative-side electrical wire 15b of the wire harness 16b connected to the negative-side connection terminal 52b of the second circuit assembly 14b, are housed and held in the shared connector housing 62b, and thus a single harness end connector 60b is formed. Furthermore, the positive-side electrical wire 15a and the negative-side electrical wire 15b that extend from the harness end connector 60b are housed in the shared covering member 17, and thus the wire harness 16b is formed. The two electrical wire-side connection terminals 64 of the wire harness 16b are configured to be respectively electrically connected to the positive-side connection terminal 52a of the first connector 48 (i) of the first circuit assembly 14a and the negative-side connection terminal 52b of the second connector 48(ii) of the second circuit assembly 14b. That is, the single harness end connector 60b of the wire harness 16b is fitted and connected to the first connector 48(i) provided in the first circuit assembly 14a and the second connector 48(ii) provided in the second circuit assembly 14b, at the same time. Note that the wire harness 16a is configured such that the end of the low-voltage positive-side electrical wire 15a is provided with the harness end connector 60a, and the electrical wire-side connection terminals 64 of the wire harness 16a is inserted into a through hole 30 in the housing body 12 and is electrically connected to the low-voltage positive-side connection terminal 52a of the third connector 48 (iii) of the first circuit assembly 14a. Similarly, the wire harness 16c is configured such that the end of the low-voltage negative-side electrical wire 15b is provided with the harness end connector 60c, and the electrical wire-side connection terminals 64 of the wire harness 16c is inserted into a through hole 30 in the housing body 12 and is electrically connected to the low-voltage negative-side connection terminal 52b of the fourth connector 48 (iv) of the second circuit assembly 14b.

With the wire harness connecting structure 10 for two circuit assemblies with such a configuration, the positive-side connection terminal 52a provided in the first circuit assembly 14a and the negative-side connection terminal 52b provided in the second circuit assembly 14b are located adjacent to each other. Also, the two electrical wire-side connection terminals 64 connected to the positive-side connection terminal 52a and the negative-side connection terminal 52b are housed and held in the shared connector housing 62b, and thus a single harness end connector 60b is formed. Furthermore, the positive-side electrical wire 15a and the negative-side electrical wire 15b that extend from the harness end connector 60b are housed in the shared covering member 17, and thus the wire harness 16b is formed. With this configuration, compared to a conventional configuration in which two electrical wire-side terminals are separately connected to the positive-side connection terminal and the negative-side connection terminal, it is possible to establish the connections at the same time by simply connecting the single harness end connector 60b that is provided with two electrical wire-side connection terminals 64.

Therefore, it is possible to easily establish the connections to the positive-side connection terminal 52a and the negative-side connection terminal 52b through a small number of work steps. Also, since it is possible to establish the connections using the single harness end connector 60b, it is also possible to reduce the number of parts, and improve space efficiency. Also, the single harness end connector 60b is provided with the positive-side connection terminal 52a and the negative-side connection terminal 52b through which currents flow in opposite directions, and thus magnetic fields that will be generated can be cancelled out, which reduces electromagnetic induction noise or prevents it from occurring. In addition, one of the electrical wires that extend from the single harness end connector 60b, namely the electrical wire 15a, has a shield effect on the other, namely the electrical wire 15b, and therefore it is possible to reduce jump-in noise from a motor or various kinds of on-board components. Therefore, even if the wire harness 16b is a high-voltage wire harness that is to be connected to the battery module 33 as in the present embodiment, it is possible to, for example, simplify the shielding structure of the covering member 17, which also contributes to a reduction in costs, in addition to realizing high space efficiency.

If a single harness end connector 60b is connected to a first connector 48(i) and a second connector 48(ii) respectively separately provided in the first circuit assembly 14a and the second circuit assembly 14b, dimensional tolerances accumulate, and there is the risk of positioning of the connectors being difficult. In contrast, in the harness end connector 60b. the third press-fit terminal 93 and the housing movable portion 68 enclosing it are displaceable in a radial direction relative to the housing body 66, and thus dimensional tolerances can be absorbed and smooth connection with connectors can be realized.

Also, the connectors 48(i) to 48(iv) are provided in the first circuit assembly 14a and the second circuit assembly 14b housed in the housing body 12, and the connectors 48(i) to 48(iv) are located so as to face the through holes 30 of the housing body 12 with a gap therebetween. Furthermore, the harness end connectors 60a to 60c provided at the ends of the wire harnesses 16a to 16c are configured to be inserted into the through holes 30 provided in the housing body 12 and to be directly connected to the connectors 48(i) to 48(iv) provided in the first circuit assembly 14a and the second circuit assembly 14b. Thus, it is possible to eliminate the need for parts that are necessary for a conventional structure, namely, a housing connector provided on a peripheral wall of a housing, and a wire harness and a bus bar that electrically connect the housing connector and a circuit assembly to each other. Therefore, it is possible to reduce the number of parts such as housing connectors and wire harnesses, and accordingly reduce the number of work steps. Also, it is possible to save space that is needed to connect the circuit assemblies and the wire harnesses to each other.

Although an embodiment of the present disclosure has been described above, the present disclosure is not limited to any specific description of the embodiment. For example, in the embodiment above, the first connection terminal provided in the first circuit assembly 14a is the positive-side connection terminal 52a, and the second connection terminal provided in the second circuit assembly 14b is the negative-side connection terminal 52b. However, the present disclosure is not limited to such a configuration. For example, the present disclosure is also applicable to a case where both the first connection terminal and the second connection terminal are positive-side terminals or negative-side terminals. If both the first connection terminal and the second connection terminal are on the positive-side, the first electrical wire and the second electrical wire that are connected thereto are also on the positive-side, and first and second electrical wires that are both on the positive side are led out from the harness end connector 60b that has the shared connector housing 50. If both the first connection terminal and the second connection terminal are on the negative-side, the first electrical wire and the second electrical wire that are connected thereto are also on the negative-side, and first and second electrical wires that are both on the negative side are led out from the harness end connector 60b. In both cases, the harness end connector 60b, which is connected to the first connection terminal and second connection terminal that are separated from each other and protrude from the first circuit assembly 14a and the second circuit assembly 14b that are separate members, can be realized as a single member. Thus, it is possible to realize connection of the wire harnesses through a small number of work steps using a small number of parts, with high space efficiency.

In the embodiment above, the electrical wire-side connection terminals 64 of the harness end connectors 60a to 60c have a floating structure that is held so as to be displaceable relative to the housing body 66. However, the connection terminals 52 of the connectors 48(i) to 48(iv) may have a floating structure that is held so as to be displaceable relative to the connector housings 62a to 62c, or both may have a floating structure. In the embodiment above, the positioning protrusions 58 are provided on the housing body 12 and the positioning cavities 56 are provided in the first circuit assembly 14a and the second circuit assembly 14b. However, they are interchangeable. Furthermore, the present disclosure is also applicable when a wire harness is to be connected to a circuit assembly that is housed in a housing of various types, as well as in the battery pack 36 described as an example.

What is claimed is:

1. A wire harness connecting structure for two circuit assemblies, the wire harness connecting structure comprising:
   a pair of positive-side connection terminals that are provided in a first circuit assembly;
   a pair of negative-side connection terminals that are provided in a second circuit assembly, whereby one of the pair of negative-side connection terminals is disposed adjacent to one of the pair of positive-side connection terminals;
   a positive-side harness end connector configured to house a first positive-side electrical wire that is to be connected to one of the pair of positive-side connection terminals;
   a negative-side harness end connector configured to house a first negative-side electrical wire that is to be connected to one of the pair of negative-side connection terminals;
   a single harness end connector configured to house a second positive-side electrical wire and a second negative-side electrical wire in a side-by-side relationship, the second positive-side electrical wire and the second negative-side electrical wire are to be connected to the other one of the pair of positive-side connection terminals and the other one of the pair of negative-side connection terminals, and
   wherein an electrical circuit is simultaneously completed in both the first and second circuit assemblies when the positive-side harness end connector and the negative-side harness end connector are both seated to respective ones of the pair of positive-side connection terminals and negative-side connection terminals and the single harness end connector is subsequently seated to the other of the pair of positive-side connection terminals and negative-side connection terminals respectively.

2. The wire harness connecting structure according to claim 1, wherein the second positive-side electrical wire and the second negative-side electrical wire that extend from the single harness end connector are housed in a shared covering member, and thus a wire harness is formed.

3. The wire harness connecting structure for two circuit assemblies according to claim 2,
   wherein one of the pair of positive-side connection terminals provided in the first circuit assembly is housed and positioned in a connector housing that is provided in the first circuit assembly, and thus a first connector is formed,
   one of the pair of negative-side connection terminals provided in the second circuit assembly is housed and positioned in a connector housing that is provided in the second circuit assembly, and thus a second connector is formed, the single harness end connector of the wire harness is configured to be fitted and connected to the first connector and the second connector at the same time, and at least one of: the single harness end connector and each of the first and second connectors has a floating structure in which the connection terminal thereof and a housing movable portion that encloses the connection terminal are held so as to be displaceable relative to a body of the connector housing thereof.

4. The wire harness connecting structure for two circuit assemblies according to claim 2, wherein the outer circumferential surface of the connector housing of the single harness end connector is press-fitted to inner circumferential edge portions of the through holes of the circuit assembly housing with seal members therebetween.

5. The wire harness connecting structure for two circuit assemblies according to claim 1, wherein the outer circumferential surface of the connector housing of the single harness end connector is press-fitted to inner circumferential edge portions of the through holes of the circuit assembly housing with seal members therebetween.

6. The wire harness connecting structure for two circuit assemblies according to claim 1, wherein one of the pair of positive-side connection terminals provided in the first circuit assembly is housed and positioned in a connector housing that is provided in the first circuit assembly, and thus a first connector is formed, one of the pair of negative-side connection terminals provided in the second circuit assembly is housed and positioned in a connector housing that is provided in the second circuit assembly, and thus a second connector is formed, the single harness end connector is configured to be fitted and connected to the first connector and the second connector at the same time, and at least one of: the single harness end connector and each of the first and second connectors has a floating structure in which the connection terminal thereof and a housing movable portion that encloses the connection terminal are held so as to be displaceable relative to a body of the connector housing thereof.

7. The wire harness connecting structure for two circuit assemblies according to claim 6, wherein the outer circumferential surface of the connector housing of the single harness end connector is press-fitted to inner circumferential edge portions of the through holes of the circuit assembly housing with seal members therebetween.

8. The wire harness connecting structure for two circuit assemblies according to claim 6, wherein the first circuit assembly and the second circuit assembly are housed and positioned in one circuit assembly housing, and the first connector and the second connector are located so as to face through holes that are provided in a wall of the circuit assembly housing, and the single harness end connector is configured to be inserted into the through holes of the circuit assembly housing and to be connected to the first connector and the second connector.

9. The wire harness connecting structure for two circuit assemblies according to claim 8, wherein the outer circumferential surface of the connector housing of the single harness end connector is press-fitted to inner circumferential edge portions of the through holes of the circuit assembly housing with seal members therebetween.

10. The wire harness connecting structure for two circuit assemblies according to claim 8, wherein a positioning mechanism is provided between surfaces that face each other of the circuit assembly housing and the first connector and the second connector, the positioning mechanism including positioning protrusions and positioning cavities that are configured to be fitted to each other, the positioning protrusions being provided on one of: the housing; and the first connector and the second connector, and the positioning cavities being provided in the other of: the circuit assembly housing and the first connector and the second connector, and a dimensional tolerance of a gap between surfaces that face each other of the positioning protrusions and the positioning cavities is smaller than the length of displacement of the connection terminal in the floating structure, relative to the connector housing.

11. The wire harness connecting structure for two circuit assemblies according to claim 10, wherein the outer circumferential surface of the connector housing of the single harness end connector is press-fitted to inner circumferential edge portions of the through holes of the circuit assembly housing with seal members therebetween.

* * * * *